United States Patent [19]

Pomella et al.

[11] 4,118,771
[45] Oct. 3, 1978

[54] NUMERICAL CONTROL SYSTEM FOR MACHINE TOOLS

[75] Inventors: Piero Pomella; Luciano Lauro, both of Ivrea (Turin), Italy

[73] Assignee: Ing. C. Olivetti & C., S.p.A., Ivrea (Torin), Italy

[21] Appl. No.: 782,172

[22] Filed: Mar. 28, 1977

[30] Foreign Application Priority Data

Mar. 29, 1976 [IT] Italy ............................... 67725 A/76

[51] Int. Cl.² ..................... G06F 15/46; G06F 15/16
[52] U.S. Cl. .................................. 364/101; 364/102; 364/200; 364/474
[58] Field of Search ............... 364/200, 101, 102, 107, 364/474, 900; 235/151.11

[56] References Cited

U.S. PATENT DOCUMENTS

| | | | |
|---|---|---|---|
| 3,348,210 | 10/1967 | Ochsner | 364/200 |
| 3,631,405 | 12/1971 | Hoff et al. | 364/200 |
| 3,783,253 | 1/1974 | Anderson et al. | 235/151.11 |
| 3,882,304 | 5/1975 | Walters | 235/151.11 |
| 4,058,711 | 11/1977 | Ondercin et al. | 364/101 |

Primary Examiner—Felix D. Gruber
Attorney, Agent, or Firm—Schuyler, Birch, Swindler, McKie & Beckett

[57] ABSTRACT

A numerical control system for machining centers, having a RAM and two groups of peripheral units, comprises two proessors interconnected by means of a common signal bus and adapted to operate simultaneously sharing access automatically to the RAM and to the peripheral units.

One of the two processors is specialized for executing the computations relating to the interpolation of the path of the center of the tool with respect to the workpiece to be machined, while the second processor is specialized in control of the said peripherals. One group of peripherals comprises input and output means for data and programs and another group comprises a series of units for measuring and controlling the movement of the said tool and the said workpiece. The said processors are connected to the said memory and to the said input and output means by means of one signal bus, the measuring and control units are interconnected by means of a second signal bus connected to the first bus through a bidirectional interface.

13 Claims, 8 Drawing Figures ns. The system computes, on
NUMERICAL CONTROL SYSTEM FOR MACHINE TOOLS

BACKGROUND OF THE INVENTION

The present invention relates to a numerical control system for the numerical control of machine tools.

Known control systems have a central processing unit which is required to attend both to the handling of the general control information of the machine tool and to the execution in real time of the complex calculations required for the control of the path of a tool with respect to a workpiece being machined. These control units have a limited flexibility, however, chiefly as regards connection with peripheral units, and a limitation in the dialogue between operator and machine.

SUMMARY OF THE INVENTION

The object of the present invention is to provide a numerical control system in which the above-mentioned drawbacks are obviated.

According to the present invention, it is now provided a numerical control system for machining centres or similar working machines adapted to control the relative movement of a tool and a workpiece to be machined in accordance with a predetermined machining program, comprising at least one program reading unit, a random access memory (RAM) and at least one peripheral unit, and at least two processors interconnected by means of a common signal bus and adapted to operate simultaneously sharing access automatically to the RAM and to the peripheral unit.

BRIEF DESCRIPTION OF THE DRAWINGS

The invention will be described in more detail, by way of example, with reference to the accompanying drawings, wherein.

DESCRIPTION OF THE PREFERRED EMBODIMENT

Introduction

The numerical control system is used to control a machining centre comprising at least one working head carrying a tool, and a support for the workpiece to be machined. The working head is movable with respect to the support (or viceversa) along one or more axes, in general three of five axes in the case of centres for machining complex surfaces and profiles. The movements along the axes are effected by corresponding servomotors, which are controlled individually in accordance with a numerical program generally recorded on a punched or magnetic tape. This program supplies the absolute or incremental position data and the speed data along the path of the relative movement of tool and workpiece, possibly expressed in terms of predetermined geometrical functions. The system computes, on the basis of the data of the program and of the instantaneous relative position of the tool with respect to the workpiece, a series of intermediate data for the control of the servomotors obtained by means of an interpolation system, substantially as described in the U.S. Pat. No. 3,518,513.

Figure 1:
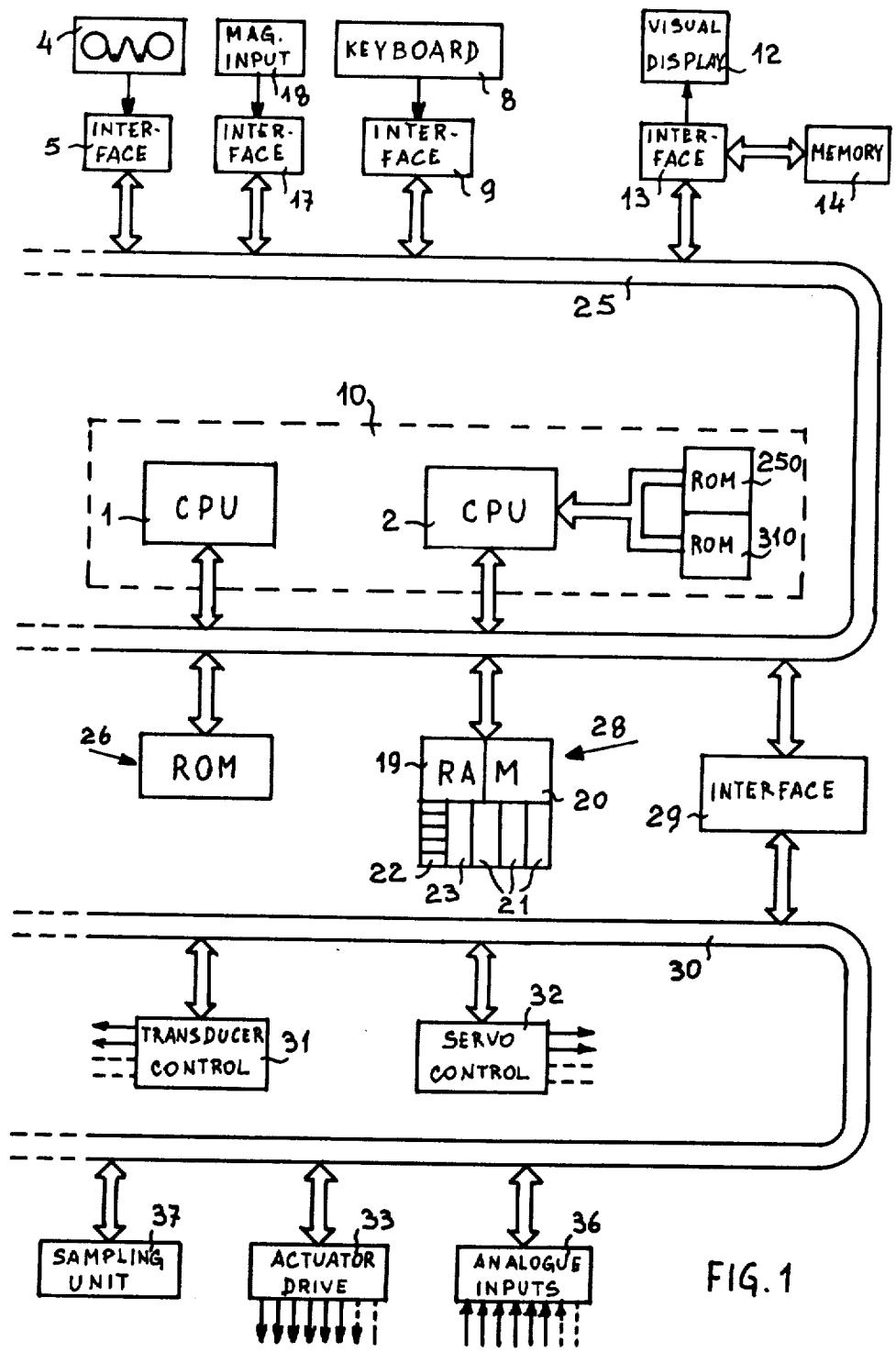
FIG. 1 is a general block diagram of a numerical control system embodying the invention.

Referring to FIG. 1, the numerical control system comprises a processing unit 10, which receives information from a tape reader 4 reading the tape on which the machining program is recorded. The system moreover comprises a manual input 8 constituted by an alphanumeric keyboard and a command key console, an output unit constituted by a visual display 12, and an automatic data input unit 18 constituted by a magnetic disc or tape unit. The units 4, 8, 12 and 18 form a first group of peripherals of the system.

The numerical control system moreover comprises a second group of peripheral units formed by a series of units for measuring and controlling the movement of the working head with respect to the workpiece. This group comprises a control unit 31 for a series of transducers for detecting dimensions, a control unit 32 for a series of analogue outputs for control of the servomotors, a driving unit 33 for electromechanical actuators, such as electromagnets and electric valves for control of various parts of the machining centre, an input unit 36 for analogue singals coming from various parts of the machining centre, such as the signals confirming that predetermined operations have been effected, and a unit 37 for timing the sampling of the position and speed data for each axis.

The sampling consists of the simultaneous reading of the current coordinates of all the axes, which are measured by the dimension detectors and supplied by the unit 31, the computation of the corresponding position errors on the basis of the computed coordinates, the computation of an actuating signal on the basis of the position error and of the effective-speed singal, and the conversion of the actuating signal from digital form to analogue form. The unit 37 times the sampling of the data for each axis to take place at a frequency of about 200 Hz, which therefore defines the sampling cycle.

Control of multi-processor

The central processing unit 10 comprises a first processor CPU 1 and a second processor CPU 2 interconnected by means of a common signal bus 25.

The tape reader 4 is connected to the bus 25 by a corresponding interface 5, while the operating keyboard and console 8 is connected through a telecommunication interface 9. The visual display unit 12 is connected through a corresponding interface 13 connected in turn to a memory 14 which stores the decoding data enabling character codes on the bus 25 to be converted to signals enabling the display unit 12 to display the characters in a manner known per se. The magnetic disc or tape unit 18 is connected through a corresponding interface 17. The system moreover comprises a read-only memory ROM 26 and a random access read-write memory RAM 28, both of which are connected to the bus 25. A second common signal bus 30 is connected to the bus 25 via a bidirectional interface unit 29. The bus 30 moreover connects the dimension detecting unit 31, the control unit 32 for the analogue outputs, the driving unit 33 for electromechanical actuators, the input unit 36 and the unit 37 for sampling the data.

The bus 25, which connects the two processors CPU 1 and CPU 2 and the peripheral units of the data processing system, has a triggering threshold voltage of 5 V, whereby it is adapted to transmit data at high speed. On the other hand, the bus 30 connecting the peripheral units interacting with servomechanisms or sensors of the machine tool has a triggering threshold voltage of 15 v, whereby it transmits the data at a low speed. In view of the non-compressible actuating times of the various parts of the machine tool, this low speed does not reduce the speed of the system. On the other hand, the higher triggering threshold in the bus 30 constitutes a higher noise threshold, whereby all the electromagnetic disturbances which are generated by the various actuators, such as servomotors, electric valves, microswitches, etc., are limited.

The ROM 26 contains essentially the microprograms which control the system. The CPU 2 is moreover controlled by a ROM section 250 which contains the computing routines of the CPU 2 which are specific with respect to the workpiece, and by a ROM section 310 which contains the routines controlling the elementary operations of the CPU 2, as will be seen better hereinafter.

The RAM 28 comprises a first section 19 for temporarily storing parameters inherent in the control of the path of the tool, such as zero coordinates of the workpiece with respect to the absolute reference, corrections of length and/or of radius of the tool, parameters relating to the shifting of the origin of the axes, programmed speed of advance of the tool along its path, etc. A second section 20 of the RAM 28 serves to preserve the data relating to the distance in course of interpolation, such as the coordinates of the final point of the distance, the directing cosines for a straight-line segment or the coordinates of the centre of a circle, the angle subtended by the arc of the circle, the total length of the distance to be covered, the speed of advance, etc.

Other subsections 21 contain numerical constants, such as the numbers 0 to 9 expressed in scientific notation, the constants for the development in series of trigonometrical functions, the factor for converting the speed from mm per minute to $\mu$m per sampling cycle, the current running coordinates of the various axes, the numerical value of the instantaneous position error, the position increment, etc.

The RAM 28 moreover comprises a series of registers 22 for storing parameters entered manually by means of corresponding selectors on the keyboard and console 8. Finally, another section 23 of the RAM 28 stores the control logic of the automatic service facilities of the machine tool, for example automatic tool change, end-of-travel circuits of the axes, control of starting and direction of rotation of the spindle, etc., and serves as a scratch pad for the data contained in a series of registers of the dimension detecting unit 31.

The CPU 1 is of the microprocessor type, with instructions formed by one to three 8-bit bytes and an instruction execution time of 2 to 5.5 microseconds. The CPU 1 is therefore relatively slow and is used for general data handling, that is for controlling the sorting of data and the logic of the evolution of the operations, and coordinates all the functions of the peripheral units and of the entire system.

The CPU 2 is microprogrammed and uses a 64-bit microinstruction, with a typical execution time of 250 nsec. The CPU 2 is therefore a fast, high-parallelism unit devoted to the execution of the major part of the high-speed computing and logic operations. It must be borne in mind, in fact, that the problems that the computing unit of a numerical control system must handle are remarkably complex and must necessarily be solved in real time at a very high rate in order to exploit the characteristics of the servomechanism and of the machine tool fully, so as to obtain the maximum speed of execution compatible with the prescribed high precision of machining.

The time available for calculating a point of circular interpolation with vectorial control of the speed, acceleration and deceleration, in order to arrive with the exact position, speed and acceleration at the end of the interpolation step, is of the order of 2 msec; moreover, the accuracy of computation required is that for obtaining the very high precision of positioning of 1 $\mu$m in 10 m.

To this end, in the numerical control system under examination, the numbers are represented in so-called scientific notation, with mantissa and exponent. The mantissa is expressed as a decimal number of ten decimal digits; the exponent, on the other hand, is expressed as a four-bit binary number. Both the mantissa and the exponent are provided with an algebraic sign. The computation of mantissas is decimal and serial, so that it requires ten memory cycles per number; the computation of the exponent, on the other hand, is binary and parallel (four bits + one sign bit).

These problems of extreme speed and precision of computation coupled with the capacity for handling large quantities of data at high speed are solved by the mutiprocessor structure based on the use of two CPU's 1, 2 with different characteristics which are complementary to each other, which operate simultaneously in time sharing manner, both of them having access to the same memory RAM 28 and to the same peripheral units.

While the CPU 1 is devoted to the handling of the data, the CPU 2 is devoted, as has been said, to the execution of algebraic and trigonometric computations. In fact, the path of the tool, corresponding to the profile to be produced, is divided into elementary distances or lengths constituted by segments of simple lines, such as segments of a straight line, arcs of a circle or arcs of a parabola.

Processor for Handling Data

The CPU 1 comprises a basic processing unit 100 (FIG. 2) having a common internal data distribution line ("internal bus") 50 with parallelism of eight bits, to which there are connected a microinstruction register 51 and an arithmetic and logic unit ALU 63, as well as an address output bus 62 providing address signals on the bus 25. the internal bus 50 also has connections to the bus 25, which allow the bidirectional communication of data and instructions between the CPU 1 itself and the memories RAM 28 and ROM 26 (FIG. 1) and the interface circuits 5, 17, 9, 13 and 29 through the bus 25.

Figure 2:
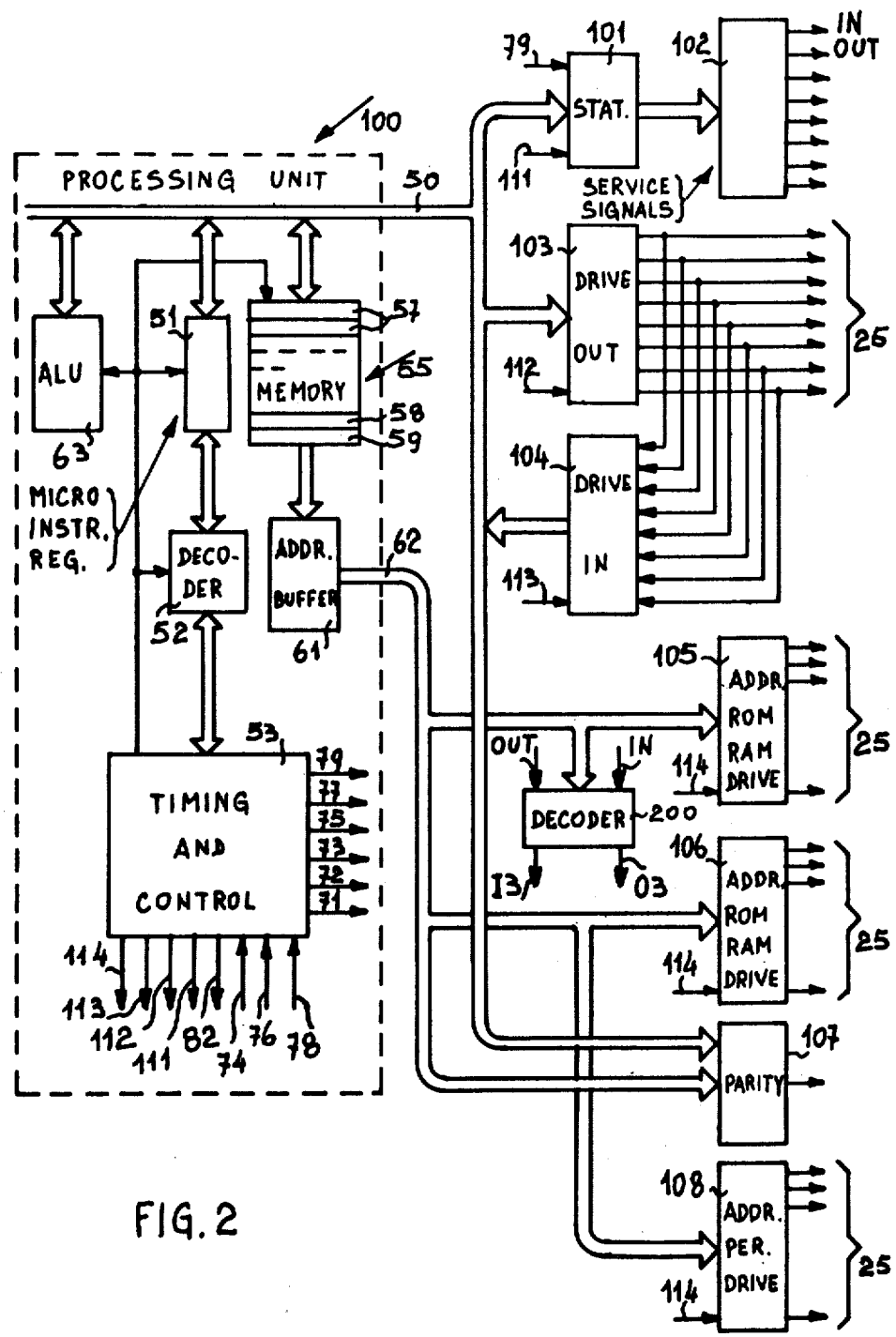
FIG. 2 is a block diagram of a first processor of the system of FIG. 1.

The generic byte of an instruction of the microprogram, extracted from the ROM 26 (FIG. 1) and temporarily present on the internal bus 50 (FIG. 2), is staticized in the register 51, which presents it to a decoder 52, which latter supplied to a timing and control circuit 53 a given group of logical control signals adapted to encode the cycle of execution of the microinstruction. More particularly, the circuit 53, as is indicated in the diagram of FIG. 2, conditions the various units of the unit 100 which are involved in the processing and handling of the data and in the handling of the program.

The basic unit 100 is provided with a working memory 55 comprising a series of addressable registers 57 and two registers 58, 59 which act as a stack-pointer and as a program counter, respectively. The stack-pointer 58 can address any location of the memory RAM 28 outside the unit 100, so that any predetermined portion of the RAM 28 can be used as a dumping and stacking memory for storing therein or retrieving therefrom the contents of any one of the data registers 57. The program counter 59, incremented automatically by one unit at each successive instruction that is executed, addresses in the ROM 26 the cell in which the next instruction of the program to be executed is contained. These addresses are staticized in a buffer 61 which finally drives the address bus 62.

The timing of the unit 100 is effected from a stabilized quartz oscillator (not shown) which supplies two periodic timing signals, with a period of about 0.5 usec. and out of phase by half a period, to the circuit 53. Since the instructions are composed of one to three bytes, each of them requires from 1 to 5 memory cycles for actual acquisition, decoding and exeuction. Each memory cycle, in order to be completed, requires from three to five successive states, each with a duration of one timing period (0.5 usec.). Depending upon the changes in external signals, other machine states may last for from one period to an indefinite number of periods. The first memory cycle detects and interprets the operation code of the instruction, the other cycles execute the instruction itself.

Moreover, for conversation with the external peripheral units, the basic unit 100 makes use of a series of signals emitted by the timing and control circuit 53. More particularly, a signal 79 is emitted to indicate the beginning of each memory cycle, and a signal 78 indicates to the unit 100 that an item of data extracted from the RAM 28 or from the ROM 26 or coming from an input unit 4, 8, 18 (FIG. 1) is present on the bus 50. If, after having issued an address for this item of data on the corresponding bus 62, the unit 100 (FIG. 2) does not receive the signal 78, it enters into a waiting state which it communicates to the outside by emitting a signal 77, whereby it can synchronize itself with the various peripherals which are slower. A signal 72 is moreover emitted to indicate to the external units (peripherals and memories) that the data bus 50 is able to receive data, while a signal 71 is emitted to command the writing of an item of data in the RAM 28.

By sending a command signal 76, an external unit, in particular the CPU 2, can be caused to take control of the data bus 50 and of the address bus 62. When the command 76 has been generated, the individual buses 50, 62 are put into a blocking state, that is of high impedance, by the unit 100, this state being indicated by a signal 75, so that the buses can be driven by the said external unit without electrical interference.

A signal 74 emitted by an external unit serves to request a program interrupt. This request is not taken into consideration if the program does not allow it or if the unit 100 is in the blocking state following the reception of a signal 76. Finally, a zeroizing signal 82 serves to zeroize the contents of the program counter 59 through the circuit 53.

The basic unit 100 is connected by the bus 50 to the bus 25 through data output and data input driving circuits 103 and 104 and, through a staticizing circuit 101 for storing service signals, to a driving circuit 102. At the instant defined by a timing pulse 111, the circuit 101 staticizes an eight-bit logical signal present on the corresponding internal bus lines. The address bus 62 is connected to a pair of driving circuits 105 and 106 for addressing the ROM 26 and the RAM 28 and a driving circuit 108 for addressing the peripheral units. A parity bit generating circuit 107 is moreover connected to the bus 50 and to the bus 62. Each of the driving circuits 102 to 108 is adapted to repeat on eight outputs lines the logical signals present as input.

The signals present on the bus 50 during a beginning-of-cycle signal 79 assume the special significance of information on the state of the unit 100, much as instruction acquisition/decoding, reading and writing in memory, reading and writing in stackpointer, reading or transmission of output data, reception of request, interrupt, etc. Therefore, the lines of the bus 50 are interrogated at the time 79 and the signals are staticized in the staticizer 101 by a signal 111, conditioning the circuit 102 to generate a series of command signals IN, OUT, etc.

The pair of driving circuits 103, 104 ensures bidirectional connection of the bus 25 with the bus 50. The two circuits 103 and 104 each have their outputs connected to the respective inputs of the other and are conditioned by deactivating signals 112 and 113, respectively, provided by the unit 53.

The signals of the bus 62 are transferred in similar manner on the two sets of eight output lines from the driving circuits 105, 106 for forming the memory addresses as output to the bus 25. The signals emitted by the driving circuit 108, on the other hand, serve for addressing the peripheral units 4, 8, 12, 18 connected to the bus 25. A signal 114 emitted by the unit 53 activates the driving circuits 102, 105, 106, 108, enabling them for control of other circuits or peripherals connected to them.

Interrupt Logic

A request for interruption of the program (interrupt) may be made of any one of the peripherals 4, 8, 12, 18, 31, 32, 33, 36 and 37 (FIG. 1) of the system by means of the corresponding request signal 74 (FIG. 2). The request is accepted by forcing a jump instruction to a service routine for that particular interrupt. Eight different interrupts are provided, in correspondence with each of which a special byte which qualifies it must be sent on the bus 50. Since the number of interrupts for the CPU 1 is much higher, in order to cover the requirements of the numerical control system described here, in which up to $2^8 = 256$ peripherals may be provided, the following mode of procedure is adopted. By indicating a generic bit by X and agreeing to write the bits in order from 0 to 7, the byte which qualifies the interrupts, at the level of the unit 100, is 111XXX11. The byte effects an unconditioned jump to a location of the RAM 28 addressed by XXX. This happens for XXX = 000–110. For the interrupts for which the group of three bits XXX is not 111, the interrupt code is obtained immediately and the codes cause a jump to as many service routines, for example starting and initial reset cycle, verification of the machine state (end of travel, locking of tool, etc.), sampling unit 37.

On the other hand, when XXX = 111, the instruction 11111111 which is an instruction for introduction from a peripheral is executed. Since for each peripheral there is provided its own interrupt, the interrupts possible in all for the CPU 1 are 7 + 256 = 263, instead of only eight. Since for each peripheral a single interrupt is necessary, the code itself of the peripheral is used as the code of the latter.

Therefore, when a generic peripheral requests an interrupt it sends the signal 74. The unit 100 responds with a signal 73 of acceptance of the interrupt request which calls the instruction 11111111 on the bus 50, this instruction being equivalent to a request for the address of the peripheral which as produced the interrupt.

In general, successive interrupt requests may arrive while a preceding interrupt is already in progress. In this case, a pre-arranged heirarchy of priorities is respected. When a following interrupt of higher priority arrives, execution of the routine of the interrupt already in progress, which is of lower priority, is suspended and the execution of the routine of the new interrupt is initiated (the reentry address corresonding to the resumption of the execution of the suspended routine being stored, however). The data sampling unit 37 operates with an interrupt of maximum priority.

Figure 3:
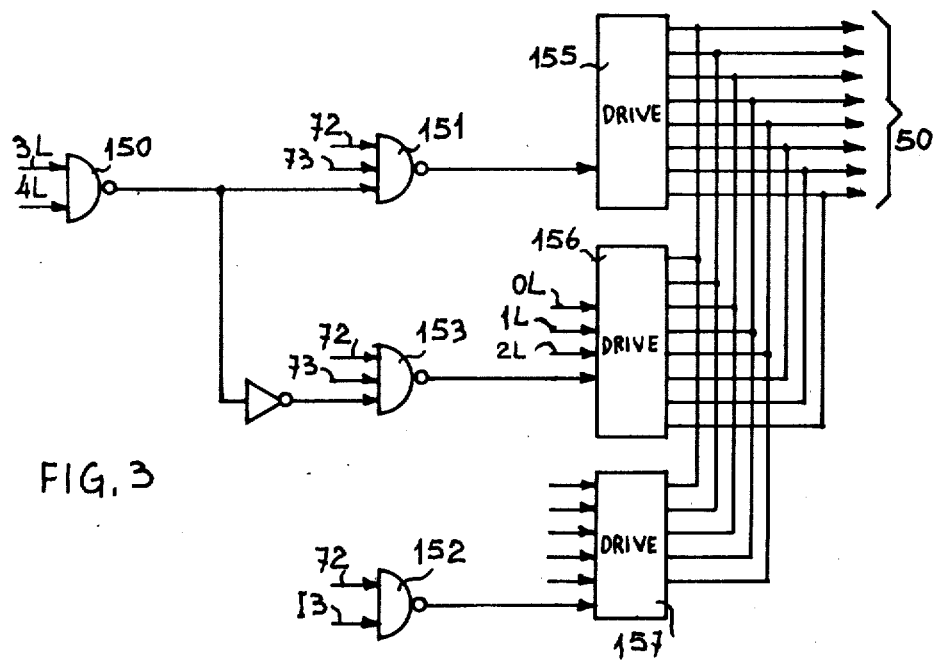
FIG. 3 is a logic diagram relating to the first processor.

More particularly, for the execution of the interrupts there is provided a group of four NAND gate 150 to 152 (FIG. 3) connected to three driving circuits 155, 156, 157 having eight homologous outputs disposed in parallel and connected in order to the lines of the bus 50. These outputs provide for causing the appearance on the bus 50 of the codes corresponding to the peripherals which from time to time request an interrupt. To be precise, two singals 3L, 4L emitted by the peripherals for which the group of three bits XXX hereinbefore mentioned assumes the values 000–110 activate the NAND gate 150. The signal 73, together with the signal 72 generated by the circuit 53 (FIG. 2), sends the output of the NAND gate 151 (FIG. 3) to 1, thus inhibiting the circuit 155. When the interrupt request is received, the inverted output of the NAND gate 150, through the NAND gate 153, activates the driving circuit 156, which now transmits on the bus 50 a byte corresponding to the datum 111xyz11, that is the bus 50 is rendered able to receive data. In this datum, the bits x, y, z coincide with the logical signals 0L, 1L, 2L, respectively, which directly define the peripheral requesting the interrupt.

On the other hand, in the event of absence of the siganls 3L or 4L, the driving circuit 156 is deactivated and instead the driving circuit 155 is activated and sends the configuration 11111111 on the bus 50, so that an unconditional jump of the program to an instruction for introduction from a peripheral is effected, by means of which there is obtained the code of the peripheral 55 which has requested the interrupt and with it the address of the routine of the interrupt itself. To this end, the decoding of the signals on the bus 62 (FIG. 2) is effected by means of a decoder 200 which, in correspondence with the signals IN and OUT, respectively, emitted by the circuit 102 for commanding introduction into, or transmission from,, peripherals, supplies a singal 13 which represents the request for the address of the peripheral after an interrupt. Via the NAND gate 152 (FIG. 3), the signal 13 enables the driving circuit 157 to receive this address and send it to the bus 50. Moreover, the decoder 200 (FIG. 2) sends an inhibition command 03 which represents the interrupt request acting on all the peripherals except the sampling unit 37 (FIG. 1), so that the unit 37 can give the sampling of the data to the machine tool with the highest priority.

Figure 4:
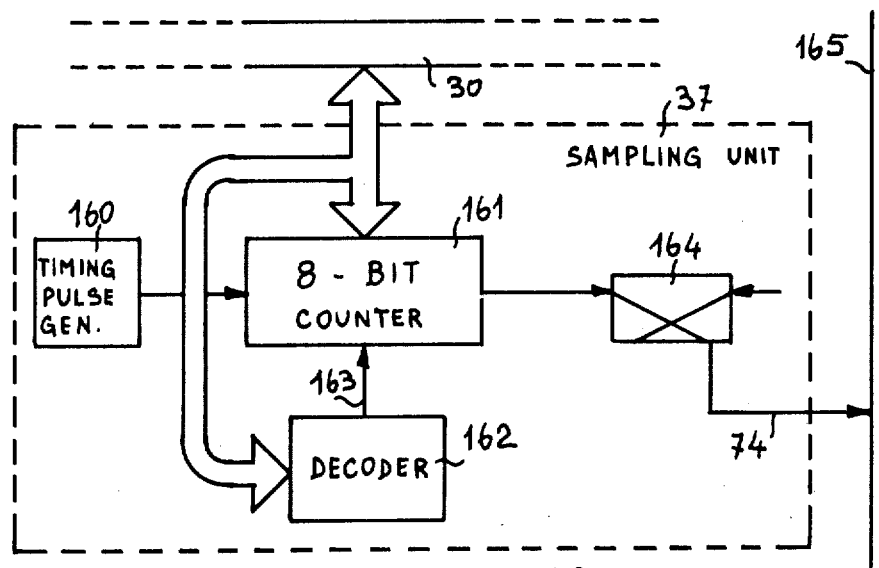
FIG. 4 is a diagram of a detail of the system of FIG. 1.

The unit 37 (FIG. 4) comprises a timing pulse generator 160 which actuates an eight-bit binary counter 161. Initially, the CPU 1 (FIG. 1) sends an instruction through the buses 25 and 30 to a decoder 162 (FIG. 4) which generates a signal 163. This enables the counter 161 to be loaded with a fixed value also sent by the CPU 1 through the buses 25 and 30. Subsequently, the counter 161 is decremented by means of the timer 160 until it is zeroized. The zero configuration of the counter 161 generates a signal which activates a flip-flop 164, which sends an interrupt request signal 74 (FIG. 2) on a line 165 (FIG. 4), thus producing the interruption of the program for sampling.

After sampling has taken place, the counter 161, with the consent of a signal supplied by the decoder 162, is reloaded to the intial value and initiates a fresh sampling cycle. The sampling interval is therefoe the time the counter 161 needs to reach the zero configuration.

Therefore, the processing unit CPU 1 (FIG. 1) receives the position and speed data for all the axes of the machine at high frequency from the control unit 31. This processed data, however, is supplied to the command unit 32 for the servomotors at the frequency given by the unit 37. For this purpose, it is obvious that the sampled signals must arrive at the unit 32 without any delay, so that the unit 37 must have the maximum interrupt priority.

Processor For High-speed Computing and Logic Operations

As already mentioned, the CPU 2 is controlled by a microprogram contained in the ROM section 310 (FIG. 1), while the ROM section 250 contains the subroutines for the execution of the computations relating to the control of the relative movement of the tool and workpiece.

The CPU 2 comprises an arithmetic and logic unit ALU 350 (FIG. 5) divided into two sections, a decimal section 351' which operates serially in BCD and a pure binary section 352' which operates in parallel. The two sections 351' and 352' are respectively prearranged for computing the mantissas and the exponents of the data. Each of these sections comprises a computing unit 351, 352, respectively, and a corresponding group of registers 353 and 354 for the mantissa and the exponent, respectively. Each of the groups comprises two registers 355 and 356 and an accumulator 371.

The elementary operations which the CPU 2 is called upon to execute are the four arithmetical operations, the alignment of the decimal point of a number so that the decimal multiplier has a prescribed exponent, and transfer and exchange between the various registers and the accumulators.

The ROM 250 (FIG. 6) is addressed by a microprogram counter 270 connected to it by means of a 12-wire addressing line 271. In correspondence with a 12-bit address, the corresponding cell of the ROM 250 is interrogated to extract a 16-bit microinstruction. This is sent to a first input 260 of a logic network or multiplexer 255. To a second input 251 of the multiplexer 255 there lead the lines of the bus 25 which carry the byte of the datum and those which carry the least significant bits of the address.

The outputs 256, 257 of the multiplexer 255 transmit the signals present at the first input 260 or the homologous signals present at the second input 251 according to whether the logical level of a change-over signal 259 sent by a flip-flop 261 is one or zero, respectively.

A logical signal 262 obtained after a delay from the changeover signal 259 of the flip-flop 261 also arrives at the multiplexer 255. In correspondence therewith, the multiplexer 255 supplies as output a signal 258 which is sent to a series of logic circuits 263 to 268 also served by a bus 252 obtained by adding eight most significant lines of the address, or the eight lines of the datum and the eight least significant lines of the address of the bus 25, or the 16 lines 256, 257 leaving the multiplexer 255.

Figure 5:
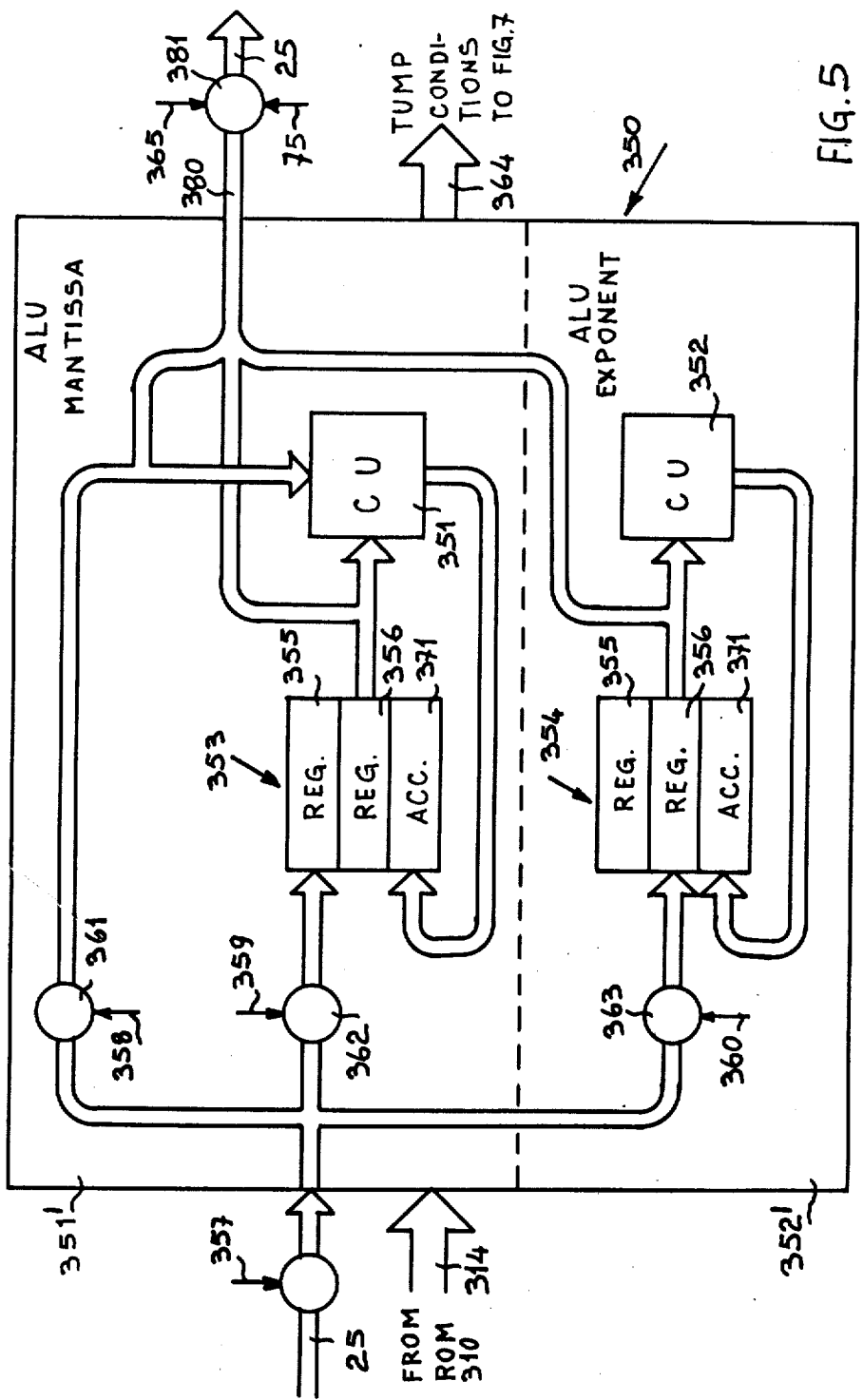
FIG. 5 is a block diagram of a second processor of the system of FIG. 1.

The circuit 263 is a decoder and staticizer which, at the time fixed by the signal 258, decodes the address byte present at the input 269 and staticizes the decoded version thereof activating one of the ten output signals 280 to 289 which constitute as many instructions for the arithmetic and logic unit ALU 350. More particularly, the instruction 280 causes the byte of the datum to assume a different significance, defining the format, sign, mantissa, exponent, etc. thereof. With the instruction 281, the result of the required operation must have the exponent defined by the datum. The instruction 282 effects the transfer of the contents of the register of the ROM 28 currently addressed to the accumulator 371 of the group 353 (FIG. 5). The instruction 283 (FIGS. 5 and 6) transfers the contents of the register of the RAM 28 currently addressed to the accumulator 371 of the group 354. The instructions 284 and 285 transfer the contents of the first register 355 or those of the register 356, respectively, of the group 353 to the register of the RAM 28 currently addressed. The instruction 286 enables all of the RAM 28 to be addressed in its maximum configuration. The instruction 287 activates the microprogram of the ROM 250, loading the datum into the microprogram counter 270, which selects the routines of the microprogram, for example the routine of computation of trigonometrical or quadratic functions, of computation of the progressive dimension in circular interpolation, etc. The instruction 287 sets the flip-flop 261, while the instruction 288 defines the end of the microprogram, resetting the flip-flop 261. Finally, the instruction 289 is an instruction for a jump conditioned by the sign of the mantissa or by the result of the operation being or not being null. The address of the jump is supplied by the datum present on the data bus.

The circuit 264 is a staticizer for the operation code which is sent on a four-wire bus 311 and is controlled by a signal 293 supplied by an OR circuit 292 in the presence of the instruction 280 or 281. The circuit 265 is a staticizer for the register address of the RAM 28 and is controlled by a signal 295 generated by an OR circuit 296 in correspondence with one of the instructions 282, 283, 284 or 285. The circuit 266 is a memory zone staticizer controlled by the instruction 286. The numerical datum staticized by one of the three cricuits 264, 265 and 266 therefore assumes the significance given to it by the staticizer itself.

The circuit 267 is a state work staticizer which, with the consent of a signal supplied by the decoder 268, stores an eightword bit corresponding to a state of the CPU 2. This word is sent on the lines of the bus 252 and therefore of the bus 25. This word may, for example, indicate the capacity-exceeded state, the state of the result of an operation which is equal to zero, the CPU 2 occupied state, etc.

The microprogram counter 270 is loaded with the configuration of the datum, in parallel manner, with the consent of the signal 289 given by the circuit 263 through an AND circuit 274. The loading of the destination address of the jump takes place, in fact, with the consent of a signal 276 of satisfaction of the jump condition supplied by a suitable jump control circuit 275.

The ROM 310 (FIG. 7), which stores the control microprogram of the CPU 2, is interrogated by means of the signals on the bus 311 of the operation code coming from the staticizer 264 (FIG. 6) and on a five-wire bus 312 coming from a counter 313 (FIG. 7) capable of counting up to 32. The capacity of the ROM 310 is 512 64-bit microinstructions. In correspondence with each address constituted by the nine bits present on the pair of buses 311 and 312, the ROM 310 responds by sending a microinstruction of the CPU 2 on a series of output lines 314, 317, 318 and 319. The signals on the lines 314 are transmitted to the arithmetic and logic unit ALU 350 (FIG. 5) to condition the operation thereof.

The arithmetic and logic unit ALU 350 operates on the datum which reaches it from the bus 25 and is read in correspondence with a memory reading strobe 357. This datum, comprising two bytes, is handled differently according to whether it represents decimal digits of mantissas or exponents, or algebraic mantissa or exponent signs. Its correct interpretation takes place with the aid of suitable logic consent signals 358, 359, 360 acting on the AND circuits 361, 362, 363.

Each of the 16 possible elementary operations (addition, subtraction, multiplication, etc.), selected by the bus 311 (FIG. 7), is carried out by a subroutine comprising a certain number of microinstructions issued by the ROM 310. Each microinstruction is executed in a certain number of cycles or periods of the basic timing of 4 MHz, which is variable according to the microinstruction.

When a microinstruction is issued by the ROM 310 through the lines 317, a counter 315 is loaded correspondingly with the number of cycles which belong to this microinstruction. The counter 315 is then decremented by one unit at each cycle. When the counter 315 returns to zero, it sends a signal which increments the contents of the counter 313 by one unit. In this way, this causes the addressing of the next microinstruction, on the basis of which the counter 313 is reloaded by means of the lines 317.

If the microinstruction is a jump microinstruction, the three-wire line 318 selects one of eight provided jump conditions. The jump condition is defined by a multiplexer 323 which then generates a signal 320 which produces the loading in parallel in the counter 313 of a configuration corresponding to the five-bit word sent by the ROM 310 itself on the five-wire line 319. This line substantially transmits the destination address of the jump within the scope of the 32 microinstructions constituting the subroutine relating to the operation currently selected. The logic relating to the jump conditions which is obtained in the multiplexer 323 operates as follows. The line 318 from the ROM 310 investigates the occurrence of one of eight jump conditions. An eight-wire line 364 coming from the arithmetic and logic unit ALU 350 carries the information concerning the occurrence or not of each condition.

The writing of the results of the computations of the ALU 350 in the RAM 28 is effected with the consent of the signal 75 (FIG. 2) of the CPU 1 and of a signal 365 (FIG. 5) sent by the CPU 2 through an AND circuit 381 disposed between the output bus 380 and the bus 25.

Under the control of the ROM 250 and the ROM 310, the CPU 2 is used in particular for computing, for each axis and for each sampling instant given by the unit 37 (FIG. 1), the numerical value of the actuating signal, which is converted into analogue form and sent to the power amplifier commanding the servomotor for the axis, in a manner known per se. It is therefore clear that these computations effected by the CPU 2 are performed at high speed without interrupting the activity of the CPU 1. It is moreover clear that the CPU 2 is controlled by two different microprograms located in the ROM 310 and the ROM 250, respectively, one for the elementary operations and the other for calculations of the path of the tool on the workpiece. Finally, it is clear that the RAM 28 is used by the CPU 2 under the command 75 of the CPU 1.

Operation of the Multi-processor System

Figure 8:
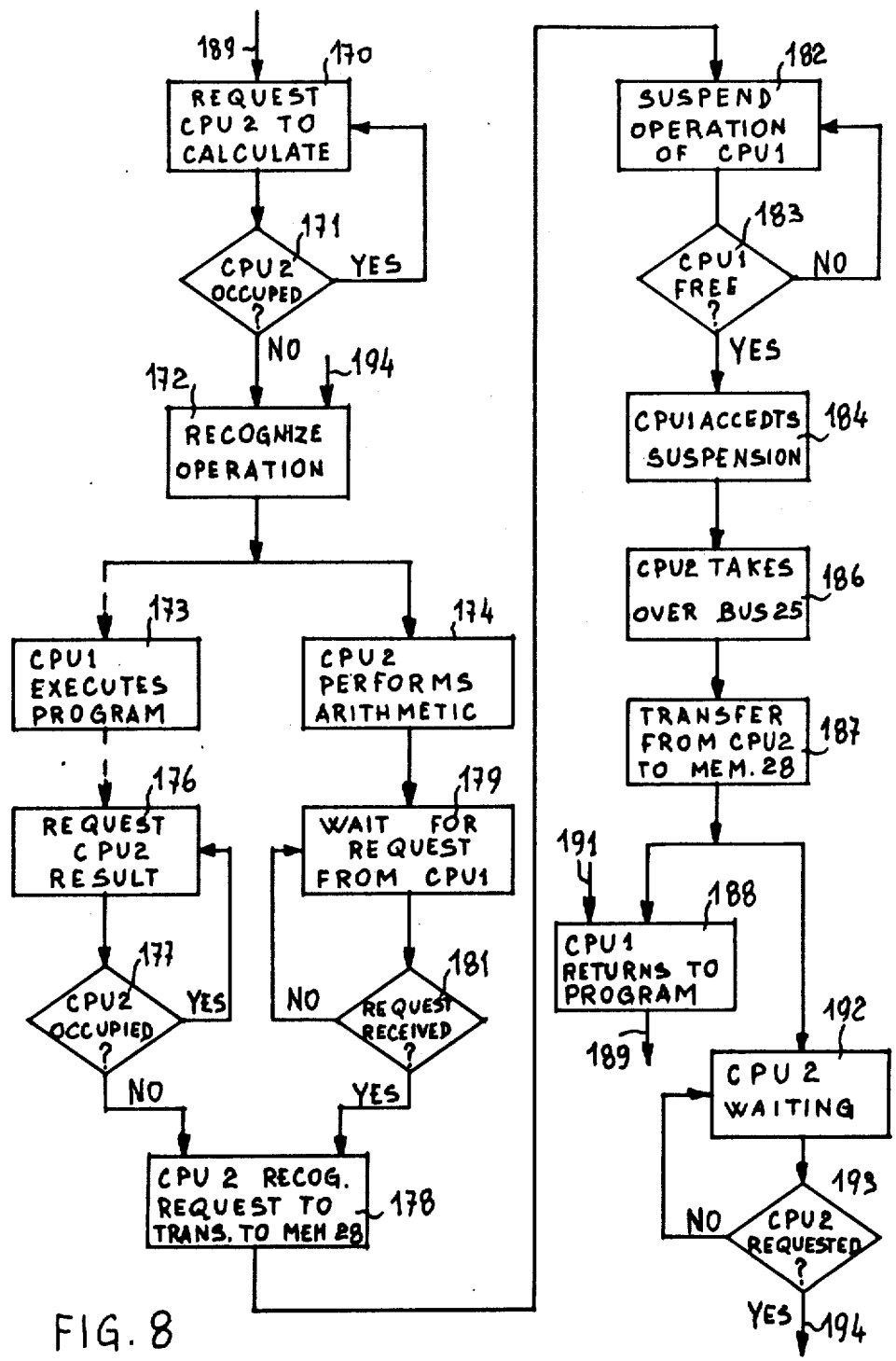
FIG. 8 is a flow diagram illustrating the operation of the system.

There will now be described with reference to FIG. 8 the flow of the operations of a typical example of working, illustrating the interaction between the two processing units CPU 1 and CPU 2.

Figure 6:
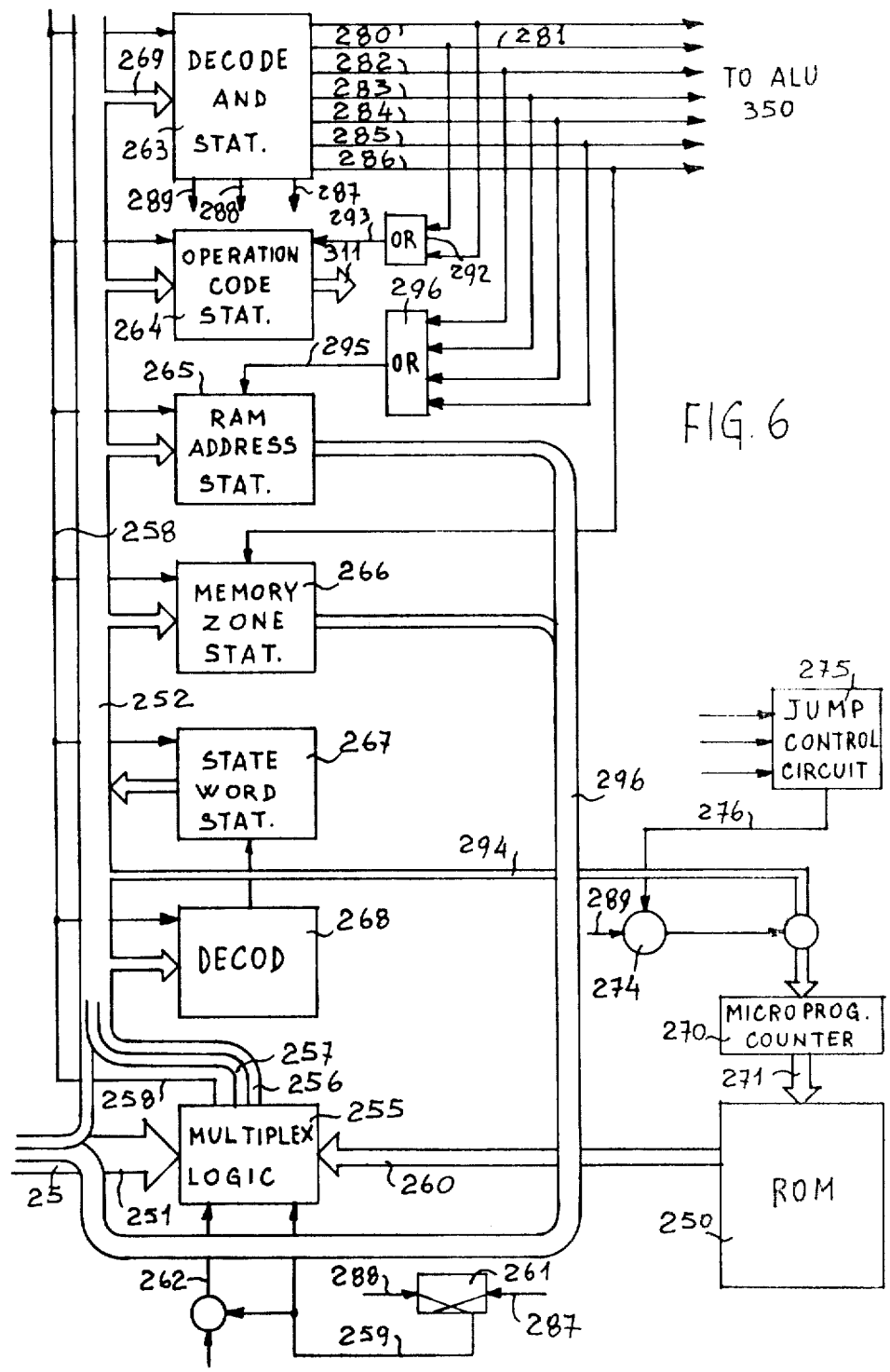
FIG. 6 is a block diagram of the logic circuit between the first and second processors of the system.
Figure 7:
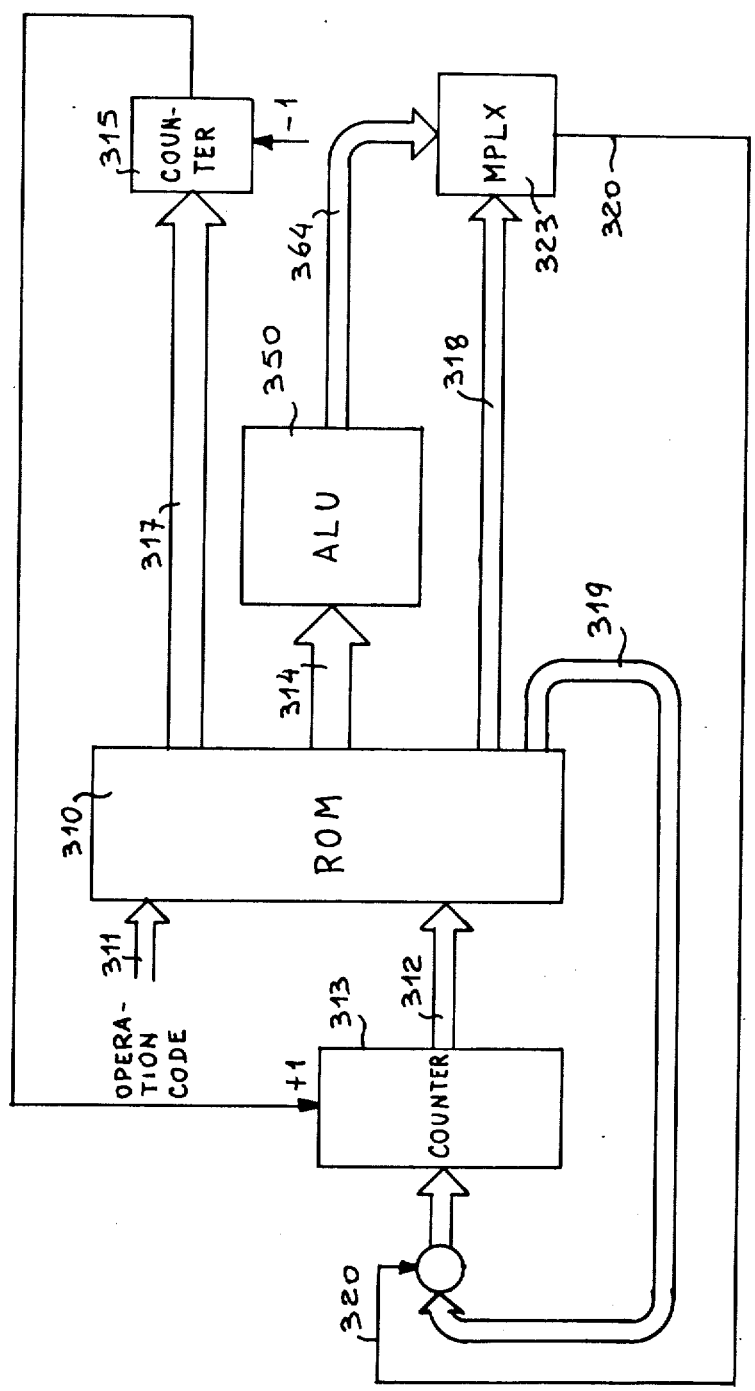
FIG. 7 is a diagram of the program control unit of the second processor.

Let it be assumed that the CPU 1 executes a request instruction 170 to the CPU 2, for effecting an arithmetical operation, for example the addition of two values relating to an axis of the machine tool. This request is made via the circuit 103 (FIG. 2) and the bus 25. The execution of this instruction causes a testing 171 (FIG. 8) of the CPU 2 to establish whether or not it is occupied in other operations. As has already been seen, the state of the CPU 2 is signalled by the staticizer 267 (FIG. 6). If the CPU 2 is occupied, the request 170 (FIG. 8) is repeated; if it is not occupied, the CPU 2 carries out an operation 172 of recognition of the instruction for the arithmetical operation requested and staticized in the staticizer 264 (FIG. 6).

Following the operation 172 (FIG. 8), the PCU 1 and the CPU 2 can initiate in parallel two different operations. More particularly, the CPU 1 can execute one or more instructions provided by the program (block 173). Simultaneously, the CPU 2 executes the arithmetical operation requested by the CPU 1 and recognized by the former, giving through the staticizer 267 (FIG. 6) the signal indicating that the CPU 2 is occupied (block 174 in FIG. 8).

After the execution of the instructions provided (block 173), the CPU 1 executes an instruction requesting transfer of the results of the operation by the CPU 2 (block 176) to the RAM 28 (FIG. 1), which instruction is again sent via the circuit 103 (FIG. 2) and the bus 25. This execution causes a testing 177 (FIG. 8) of the CPU 2 and, as long as this is occupied, the instruction 176 is caused to be repeated. On the other hand, when the CPU 2 has completed the operation 174, it causes an operation 178 of recognition of the transfer instruction, sending the signal 365 (FIG. 5).

If, on the other hand, the operation 174 of the CPU 2 terminates before the operation 173 of the CPU 1, the CPU 2 assumes a state of waiting for the instruction from the CPU 1 for transfer of the result (block 179). This state is also staticized by the circuit 267 (FIG. 6). The operation 179 (FIG. 8) is followed by a testing 181 of the sending of this instruction by the circuit 103 (FIG. 2) of the CPU 1. As long as this instruction is not sent, the operation 179 (FIG. 8) is repeated. On the other hand, when the result of the test 181 is positive, the CPU 2 performs the instruction recognition operation 178, issuing the recognition signal 365 (FIG. 5).

Since the transfer of the result of the arithmetical operation performed by the CPU 2 requires access to the RAM 28 (FIG. 1), an operation of the CPU 1 during such transfer would create interference. Therefore, the recognition 178 (FIG. 8) of the transfer instruction causes an operation 182 of suspension of the activities of the CPU 1, which is followed by a testing 183 to establish whether the CPU 1 is free or not. This condition of the CPU 1 is indicated by the signal 75 (FIG. 2) issued by the circuit 53. If the CPU 1 is occupied, the operation 182 (FIG. 8) is repeated; if, on the other hand, it is free, the CPU 1 performs an operation 184 of acceptance of the request for suspension, generating a corresponding signal 76 (FIG. 2). This signal establishes control of the bus 25 by the CPU 2 (block 186 in FIG. 8), so that the CPU 2 effects the transfer (block 187) of the result of the operation 174 to the RAM 28 (FIG. 1) via the bus 380 (FIG. 5) and the AND circuit 381. The transfer 187 (FIG. 8) having been completed, the two processing units CPU 1 and CPU 2 can recommence to operate in parallel. For example, the CPU 1 can initiate the execution of one or more instructions provided by the program (block 188), until another instruction requesting operation of the CPU 2 is encountered, thus bringing itself to the starting point 189 of the diagram of FIG. 8. It is to be noted that the system brings itself to the condition provided by the block 188 whenever the machine is switched on, which is indicated by the reference 191 in FIG. 8.

During the operations 188 of the CPU 1, the CPU 2 brings itself into a condition of waiting 192 for an instruction from the CPU 1, which condition is also staticized by the circuit 267 (FIG. 6). A test 193 (FIG. 8) is now carried out to establish whether the sending of such instruction by the circuit 103 (FIG. 2) has taken place or not. In the negative case, the operation 192 (FIG. 8) is repeated, in the positive case the system brings itself to the starting point 194 of the diagram of FIG. 8. It is therefore clear that the two processors CPU 1 and CPU 2 are connected by means of the common bus 25 and are adapted to operate simultaneously sharing access automatically to the RAM 28 and, therefore, through the buses 25 and 30 and the interface 29, to the peripherals.

Operator-machine Interface

The instructions to be given to the machine tool through the control unit are entered by the operator in compact and coded form by means of a conversation between operator and machine for the preparation of new programs and the modification of the programmed instructions both from the geometrical and from the technological point of view. Manual commands are moreover provided for the axes and other movements of the machine tool for initial mechanical perfection on the first workpiece of a series and for possible resumptions from abnormal positions. Finally, a command is provided for normal repetitive operation during the machining of a batch of workpieces. In this case, control messages are provided for easy supervision of the correct development of the operations.

The encoding of the user instructions is based on the use of three-letter abbreviations which specify the subject handled and the functions required within the limits of the subject. For example, in order to execute a program recorded in the RAM 28, from program block No. 125 to block No. 724, the commands necessary are EXE, PME, N125, N724, ↵, that is EXEcute from Permanent MEmory the program from block N125 to block N724. The symbol "⌐" corresponds to a specific key of the keyboard 8 and it has been decided to render it operative.

The example given above illustrates the simplicity and conciseness of the language. The abbreviations used therein are derived from the English language. Optionally, there is provided a change-over logic which permits the use of abbreviations derived from other languages. If it is desired to use Italian, there is entered on the keyboard the code ITA, for English ENG, for French FRA, etc.

Closely connected with the language logic is the manner in which the computer responds to the operator in the stages of conversation and informs him concerning the evolution of the machining operations during execution.

The visual display unit 12, in co-operation with the memory 14, makes use of program tables practically unnecessary at works level, because it is possible to see whole table pages on the screen and communicate all the necessary instructions to the operator. For better adaptation to the requirements of the system, the dimensions of the characters visually displayed are variable, for example from 4 mm in height for the stages of preparation or perfection of programs to 8 mm for the visual display of data in the stage of execution, to more than 30 mm for emergeny messages.

In stages of modifications to programs, corrections can be made by having visually displayed at the same time on the screen both the table in which the modification is being made and the block in the stage of preparation for insertion in the table as a correction.

The interconnections of the two buses 25 and 30 with the units which drive them are continuously checked by means of a parity check executed in parallel by the unit 107 (FIG. 2) on the data transmitted. In this way assurance is obtained that the signals on the buses 25 and 30 reach all the modules of the system connected to them in the right way.

The data written in the RAM 28 (FIG. 1) is stored with a redundant code so that it can be checked at the moment of use. The commands which go to the machine tool are periodically reread by the computer to check the accuracy thereof. In this way, the intermediate driving and command circuits are automatically checked.

When operations take place from the keyboard 8, the consistency or coherence of the directives and commands is checked automatically. If they are recognized as erroneous, they are not accepted and this is clearly signalled on the visual display 12, similarly the kind of error committed.

Before the analogue actuating signal supplied to the servomechanisms under the control of the micropogram is actually used to actuate the motors, it is checked to access the probability of it being affected by transitory errors due, for example, to strong electrical distrubances. In the event of analogue actuating signal being judged improbable, it is automatically replaced by one extrapolated from the preceding run. If, on repeating the measurement, it is found that the analogue actuating signal is again outside the limits provided, locking of the axes by an emergency routine is carried out. This filtering of any possible analogue signals affected by errors enormously reduces the probability of producing imperfections in the surface finish of the workpiece being machined.

What we claim is:

1. In a machining centre or similar working machines, a numerical control system for controlling the relative movement of a tool and a workpiece to be machined in accordance with a predetermined machining program, comprising a program reading unit, an operating memory, at least one peripheral unit for measuring or controlling the movement of said tool and said workpiece, at least a pair of processors, a common signal bus means interconnecting said processors, said program reading unit, said operating memory and said peripheral unit for causing said processors to operate simultaneously, and sharing control means controlled by a program recorded in a program memory common to said two processors for causing a first one of said processors to control said peripheral unit and the second of said processors to execute the computations relating to the interpolation of the path of said tool with respect to said workpiece, said two processors automatically sharing access to said memories and said peripheral unit.

2. In a machining centre or similar working machines, a numerical control system for controlling the relative movement of a tool and a workpiece to be machined in accordance with a predetermined machining program, comprising a first group of peripheral units including input and output means for data and programs, a second group of peripheral units including a series of units for measuring and controlling the movement of said tool and said workpiece, a program reading unit, a random access memory, at least first and second of processors, a first common signal bus interconnecting said processors, said program reading unit, said memory and said input and output means for causing said processors to operate simultaneously, a second common signal bus interconnecting said measuring and control units, a bidirectional interface connecting said first signal bus and said second signal bus, and sharing control means for causing said processors to automatically share access to said memory and to said peripheral units.

3. A system according to claim 2, wherein said measuring and control units are connected to corresponding electromechanical actuators, said first signal bus having a triggering threshold such as to allow it a high data transmission speed, said second bus having a triggering threshold which is higher and such as to eliminate electrical disturbances reduced by said electromechanical actuators.

4. A system according to claim 2, wherein said sharing control means are controlled by a program recorded in a program memory common to said two processors, and wherein said first processor comprises command means for generating a series of command signals interacting with the said random access memory and said program memory and with said peripheral units by a conversation procedure, and driving means for exchanging data and addresses with the said memories and the said peripheral units.

5. A system according to claim 4, comprising additional command means for causing said driving means to exchange data and instructions between the said processors.

6. A system according to claim 4, comprising means included in each peripheral unit for generating program interrupt commands arranged according to different priority levels, said interrupt commands controlling said conversation procedure.

7. A system according to claim 6, wherein said second group of peripherals includes a data sampling unit for generating an interrupt command having the maximum priority level with respect to the other peripheral units.

8. A system according to claim 7, comprising decoding means for generating a set of program interrupt, each one corresponding to one of said interrupt commands, said decoding means defining, in correspondence with an additional program interrupt code, access to a number of peripheral units higher than the number of interrupt codes.

9. A system according to claim 2, wherein said second processor comprises a pair of computing units, one for the mantissa and the other for the exponent of the data supplied by the said first processor, represented in scientific notation, said computing units being controlled by a microprogram recorded in a read-only memory (ROM) of the said second processor.

10. A system as in claim 9, wherein said second processor comprises a multiplexer controlled by the data coming from the said first bus and by another microprogram unit of the said second processor for conditioning a unit for generating commands adapted to control memory addressing means and to define operation codes according to the data coming from the said first bus.

11. A system according to claim 10, comprising a decoder for the input data and a circuit controlled by said decoder for defining a series of states or conditions in which the said second processor is.

12. A system as in claim 2, wherein said second processor is controlled by two different microprograms, one of which is provided for controlling a series of elementary operations, while the other is provided for computations of the path of the tool with respect to the workpiece.

13. A system as in claim 2, wherein each of the said processors comprises means to signal its free or busy condition to the other processor via said common bus, the said condition being tested whenever the said processors must communicate with each other or access the said random access memory (RAM).

* * * * *

UNITED STATES PATENT AND TRADEMARK OFFICE
CERTIFICATE OF CORRECTION

PATENT NO. : 4,118,771
DATED : October 3, 1978
INVENTOR(S) : PIERO POMELLA et al It is certified that error appears in the above—identified patent and that said Letters Patent are hereby corrected as shown below:

On the front page of the patent, change Assignee "Ing. C. Olivetti & C., S.p.A., Ivrea" to--Olivetti Controllo Numerico S.p.A. --

Signed and Sealed this

Thirty-first Day of July 1979

[SEAL]

Attest:

LUTRELLE F. PARKER
Attesting Officer     Acting Commissioner of Patents and Trademarks